United States Patent
Tada et al.

(10) Patent No.: US 6,804,178 B2
(45) Date of Patent: Oct. 12, 2004

(54) APPARATUS AND METHOD FOR RECORDING AND REPRODUCING INFORMATION DATA TO AND FROM RING BUFFER MEMORY

(75) Inventors: Kenichiro Tada, Tokorozawa (JP); Akihiro Tozaki, Tokorozawa (JP); Hiroshi Nakamura, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 304 days.

(21) Appl. No.: 10/083,640

(22) Filed: Feb. 27, 2002

(65) Prior Publication Data

US 2002/0122358 A1 Sep. 5, 2002

(30) Foreign Application Priority Data

Feb. 28, 2001 (JP) .......................................... 2001-53601

(51) Int. Cl.[7] .............................................. G11B 21/08
(52) U.S. Cl. ................................ 369/30.23; 369/47.34; 369/47.33
(58) Field of Search ........................... 369/30.23, 47.32, 369/47.31, 47.33, 47.34; 711/3, 4, 102, 103, 104, 105, 111

(56) References Cited

U.S. PATENT DOCUMENTS

| 5,410,525 | A | * | 4/1995 | Yokota ................... 369/30.23 |
| 5,621,712 | A | * | 4/1997 | Nonaka ................... 369/30.23 |
| 5,623,459 | A | * | 4/1997 | Iwamura et al. ......... 369/30.23 |
| 5,793,724 | A | * | 8/1998 | Ichikawa et al. ........ 369/47.31 |
| 5,881,031 | A | * | 3/1999 | Asano et al. ............ 369/30.23 |
| 5,896,352 | A | * | 4/1999 | Takenaka et al. ....... 369/30.07 |
| 6,055,216 | A | * | 4/2000 | Shintani .................. 369/30.23 |

* cited by examiner

Primary Examiner—Tan Dinh
(74) Attorney, Agent, or Firm—McGinn & Gibb, PLLC (57) ABSTRACT

A ring buffer region is divided into a plurality of ring regions. Information is recorded in (or reproduced from) the ring regions from one end of the ring buffer region to the other end of the ring buffer region and from the other end to the one end in the predetermined order. The predetermined order is determined such that the recording (or reproducing) takes place skipping over at least one ring region every time.

17 Claims, 5 Drawing Sheets

APPARATUS AND METHOD FOR RECORDING AND REPRODUCING INFORMATION DATA TO AND FROM RING BUFFER MEMORY

BACKGROUND OF THE INVENTION

1. Field of the Invention

The present invention relates to an apparatus for recording information, such as audio (sound/voice) signals and video (image) signals, on a recording medium and reproducing the information from the recording medium, wherein the recording medium has a ring buffer region in which overwriting takes place repeatedly.

2. Description of the Related Art

A hard disc and a hard disc recorder are receiving increased attention because the hard disc recorder and hard disc can replace a video tape recorder and video tape as an apparatus for recording television programs. When a hard disc is used as a recording medium, so-called time shift reproduction becomes possible which reproduces a recorded program while recording a currently broadcast program. In order to achieve the time shift reproduction function, the hard disc has a ring buffer region.

Figure 1:
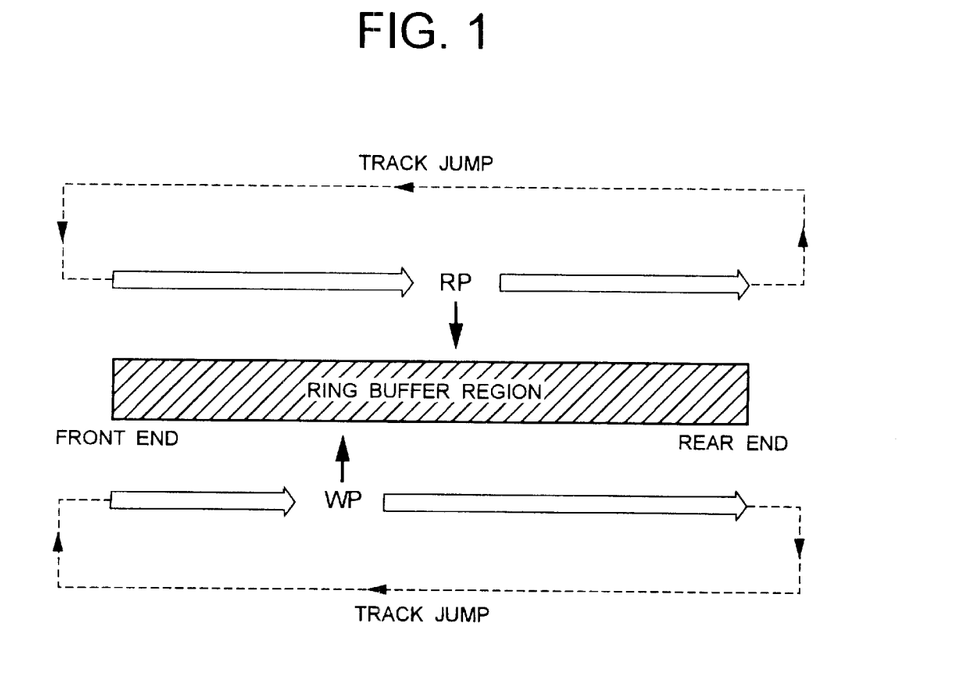
FIG. 1 is a schematic diagram to explain recording and reproducing operations using a ring buffer region.

Referring to FIG. 1 of the accompanying drawings, recordation and reproduction of information within the ring buffer region during the time shift reproduction will be described.

In FIG. 1, a write position WP indicates a current recording position in the ring buffer region, and a read position RP indicates a current reproducing position in the ring buffer region. The positions WP and RP gradually move independently from the front end of the ring buffer region to the rear end of the ring buffer region as indicated by the unshaded arrows. While the positions WP and RP are moving, a recordation/reproduction head (not shown) provided in a hard disc recorder alternately executes a reading operation to retrieve recorded information from the read position RP and a recording operation to record information at the write position WP. When the write position WP (or the read position RP) reaches the rear end of the ring buffer region, the write position WP (or the read position RP) returns to the front end of the ring buffer region. In other words, track jumping of the recordation/reproduction head from the rear end of the buffer ring region to the front end of the buffer ring region occurs as indicated by the broken line. After the track jumping, the write position WP and read position RP start moving again towards the rear end of the ring buffer region independently. The recordation/reproduction head alternately performs the information reading operation and the information recording operation again as the recordation/reproduction head moves towards the rear end of the ring buffer region.

As described above, continuous recording and reproducing of the information takes place repeatedly in a continuous or circulating manner in the ring buffer region. In order to ensure continuousness of the recordation and reproduction even while the recordation/reproduction head is jumping from the rear end of the ring buffer region to the front end as indicated by the broken line (i.e., during the track jumping of the head), there is provided a track buffer in the hard disc recorder which is a buffer used for recording and reproducing information during the track jumping. During the track jumping, the recordation/reproduction head cannot record or reproduce information on or from the hard disc. In other words, the recordation/reproduction head cannot access the hard disc during the track jumping. The track buffer is provided for compensating for information discontinuity caused by the track jumping.

When the ring buffer region is large, the time for the track jumping of the recordation/reproduction head is correspondingly large as understood from FIG. 1. Consequently, the track buffer is required to have a large capacity to compensate for the absence or non-availability of the recordation/reproduction head during the track jumping.

SUMMARY OF THE INVENTION

An object of the present invention is to provide an information recording and reproducing apparatus that can include a ring buffer region having a large capacity without causing the above described problem.

Another object of the present invention is to provide an information recording and reproducing method that can provide a ring buffer region having a large capacity without causing the above described problem.

According to one aspect of the present invention, there is provided an information recording and reproducing method for recording and reproducing a signal in and from a ring buffer region of a recording medium with a recording/reproducing head, the ring buffer region being divided into a plurality of ring regions, the information recording and reproducing method comprising the step of recording or reproducing the signal in and from the plurality of ring regions of the ring buffer region from one end (first end) of the ring buffer region towards the other end (second end) of the ring buffer region by skipping over at least one ring region at a time, and the step of recording or reproducing the signal in and from those ring regions of the ring buffer region which are skipped over in the preceding step from the other end of the ring buffer region towards the one end of the ring buffer region. The recording/reproducing head does not jump the entire length of the ring buffer region since the ring buffer region is divided into smaller regions. Therefore, a jumping distance of the recording/reproducing head is reduced, and a buffer required for compensating for discontinuity caused by track jumping of the recording/reproducing head can have a smaller capacity. Accordingly, the size of the ring buffer region can be maintained while reducing the recording capacity of the buffer.

According to another aspect of the present invention, there is provided an information recording and reproducing apparatus for recording and reproducing a signal in and from a ring buffer region of a recording medium, the ring buffer region being divided into a plurality of ring regions, said apparatus comprising a recording and reproducing head for recording or reproducing the signal in or from the plurality of ring regions, a memory for storing a predetermined order, and a movement mechanism for moving the recording and reproducing head in accordance with the predetermined order. The predetermined order includes skipping over at least one ring region at a time.

DETAILED DESCRIPTION OF THE INVENTION

Embodiments of the present invention will be described in reference to the accompanying drawings.

Figure 2:
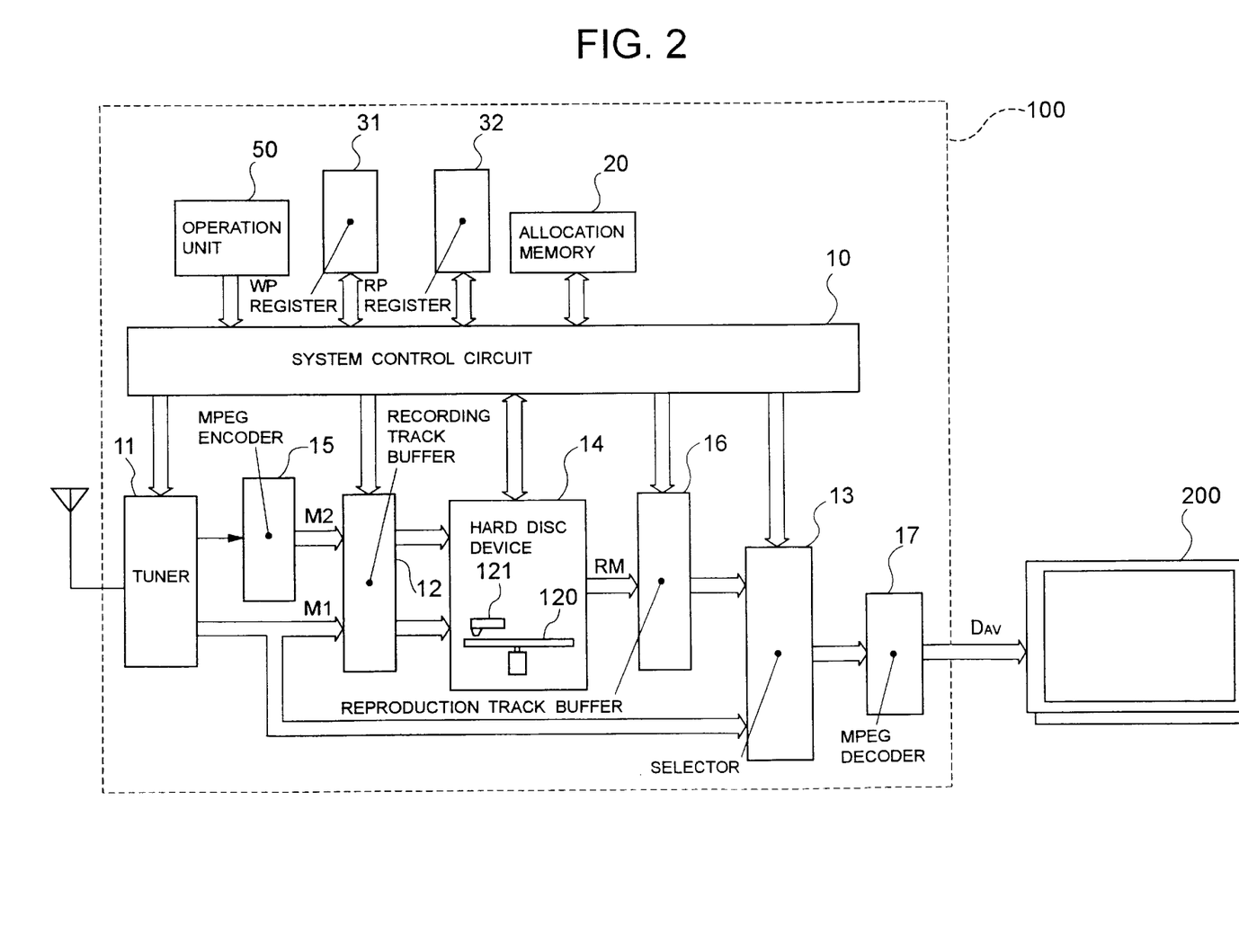
FIG. 2 is a block diagram showing an inside structure of a hard disc recorder that records and reproduces signals in and from the ring buffer region formed on a recording medium in accordance with an information recording and reproducing method of the present invention.

FIG. 2 illustrates an inside structure of a hard disc recorder 100 designed to perform a recording operation and a reproducing operation to a ring buffer region of a recording medium in accordance with an information recording and reproducing method of the present invention.

When a tuner 11 receives a digital channel designation signal from a system control circuit 10, the tuner 11 accepts a digital airwave of a channel designated by the channel designation signal. The tuner 11 then demodulates the received digital airwave to obtain an MPEG (Moving Picture Experts Group) signal M1. The MPEG signal M1 is supplied to both a recording track buffer 12 and a selector 13. The recording track buffer 12 successively stores the MPEG signals M1 as the MPEG signals M1 are supplied from the tuner 11. The recording track buffer 12 receives a read signal from the system control circuit 10. The recording track buffer 12 successively reads the MPEG signals M1 in accordance with the read signal and supplies the MPEG signals M1 to a hard disc device 14. The MPEG signals are read in the recording (recorded) order.

When the tuner 11 receives an analog channel designation signal from the system control circuit 10, the tuner 11 receives an analog television airwave (NTSC, PAL or SECAM) of a channel designated by the channel designation signal. The tuner 11 demodulates the received analog television airwave to obtain a television signal. The television signal is then introduced to an MPEG encoder 15. The MPEG encoder 15 applies an MPEG encoding process to the television signal to obtain an MPEG signal M2. The MPEG signal M2 is supplied to the recording track buffer 12.

The recording track buffer 12 successively stores the MPEG signals M2 as the MPEG signals M2 are supplied from the MPEG encoder 15. The recording track buffer 12 receives a read signal from the system control circuit 10 and reads the MPEG signals M2 in accordance with the read signal. The MPEG signals M2 are read in the recording order. The MPEG signals M2 are supplied to the hard disc device 14.

Figure 3:
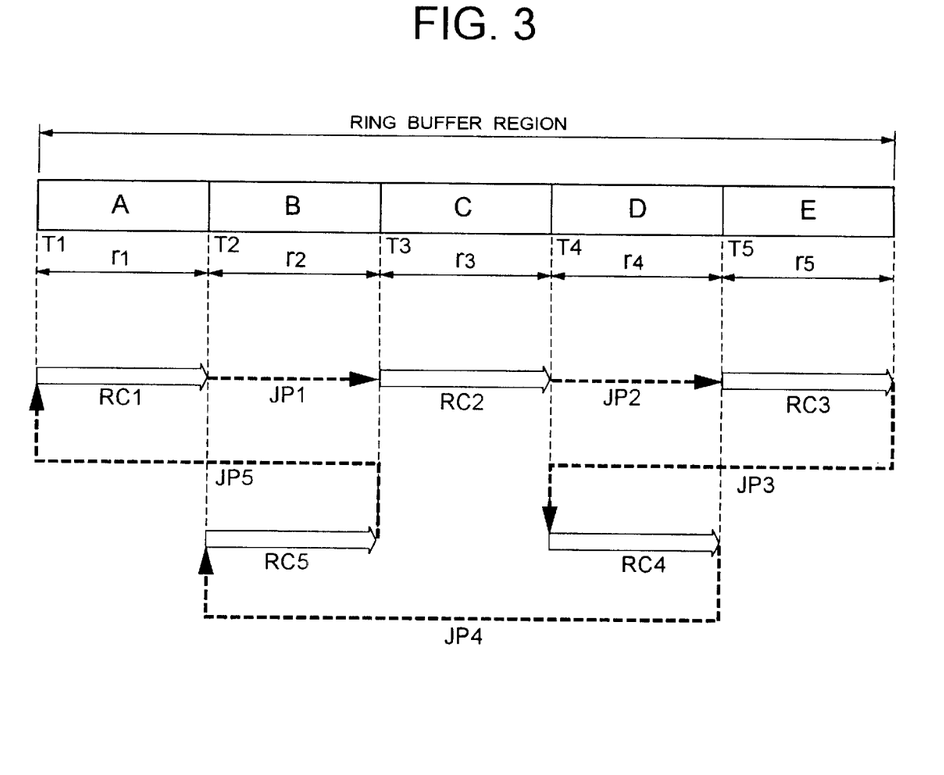
FIG. 3 illustrates recording and reproducing procedures within the ring buffer region in accordance with the information recording and reproducing method of the present invention.

The hard disc device 14 receives a ring region recording command from the system control circuit 10, and successively records (overwrites) the MPEG signals M1 or M2 supplied from the recording track buffer 12 in a ring buffer region of a hard disc 120 in accordance with the ring region recording command. As illustrated in FIG. 3, a plurality of ring regions A to E are defined on the hard disc 120. The five ring regions A to E are collectively referred to as the ring buffer region in this embodiment. It can be therefore said that the ring buffer region is divided into a plurality of smaller regions (ring regions). The ring region A is located at the physically forefront position in the ring buffer region on the hard disc 120, and the ring region E is located at the opposite position (physically rear end position) in the ring buffer region. The hard disc device 14 records the MPEG signals M1 or M2 in the segmented ring regions A to E in accordance with the order specified by allocation descriptors (will be described) stored in an allocation memory 20. During this recording operation, the system control circuit 10 causes a WP register 31 to store write points WP, which indicate current recording positions within the ring buffer region, at predetermined intervals.

The hard disc device 14 reads the MPEG signals, which are recorded in the ring buffer region of the hard disc 120, in response to a ring region read command issued from the system control circuit 10. The MPEG signals are referred to as reproduced MPEG signals RM and supplied to a reproduction track buffer 16. The hard disc device 14 reads the MPEG signals from the ring regions A to E in accordance with the order specified by the allocation descriptors stored in the allocation memory 20. During the reading operation, the system control circuit 10 causes an RP register 32 to store the read points RP, which indicate the current reading positions within the ring buffer region, at predetermined intervals.

The reproduction track buffer 16 receives the reproduced MPEG signals RM from the hard disc device 14 and stores the MPEG signals RM. The reproduction track buffer 16 reads the reproduced MPEG signals RM in response to a read command from the system control circuit 10. The reading of the reproduced MPEG signals RM takes place in the MPEG signal storing order. The reproduced MPEG signals RM are then introduced to the selector 13 from the reproduction track buffer 16.

The selector 13 selects the reproduced MPEG signals RM supplied from the reproduction track buffer 16 or the MPEG signals M1 supplied from the tuner 11 on the basis of a selection signal from the system control circuit 10. The selected signals are introduced to an MPEG decoder 17. The MPEG decoder 17 applies an MPEG decoding process to the MPEG signals to obtain audio and video signals $D_{AV}$. The audio and video signals $D_{AV}$ are then supplied to a display unit 200. The display unit 200 creates and outputs images and sounds/voices in accordance with the audio and video signals $D_{AV}$.

An operation unit 50 accepts various instructions from a user, and transmits a command to the system control circuit 10 in accordance with the instructions of the user. The operation unit 50 is, for example, a remote controller separated from (independent of) a housing of the information recording and reproducing apparatus 100.

Now, operations of the hard disc recorder 100 under the control of the system control circuit 10 will be described in detail. The operations include use of the display device 200 as a television monitor, continuous recordation of broadcast programs, and reproduction of the recorded television programs.

(1) TV Monitor

When the user wants to watch a television show in realtime, the user presses, for example, a certain button on the operation unit 50 to specify a desired channel. The operation unit 50 then supplies a television monitor command to the system control circuit 10. The system control circuit 10 issues a channel designation signal, which represents the desired channel specified by the television monitor command, to the tuner 11 such that the tuner 11 receives the airwave of the television show of the desired channel. At the same time, the system control circuit 10 supplies a selection signal to the selector 13 such that the MPEG signals M1 supplied from the tuner 11 are selected and transferred to the MPEG decoder 17.

Therefore, the MPEG signals M1 resulting from the broadcast signals received and demodulated by the tuner 11 are decoded to the audio/video signal $D_{AV}$ by the MPEG decoder 17, and transferred to the display device 200. As a result, the display device 200 displays the digital television show of the desired channel in realtime.

(2) Continuous Recording

Figure 4:
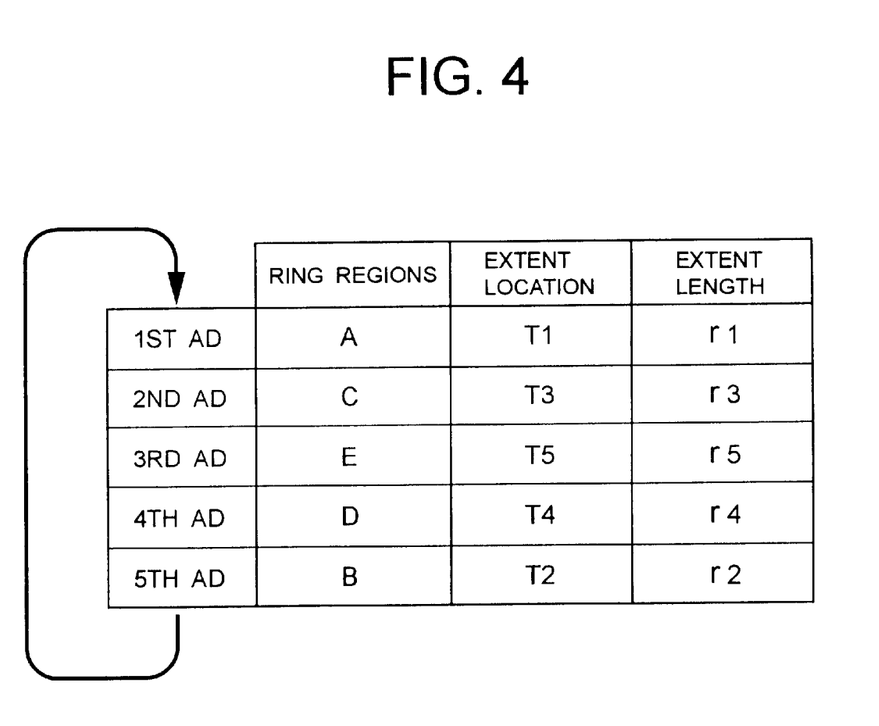
FIG. 4 illustrates a table stored in an allocation memory in which allocation descriptors are appended to respective ring regions to show the recording (or reproducing) order.

If the user wants to successively record a plurality of television shows on a desired channel, the user presses certain buttons on the operation unit 50 for such continuous recording. Upon receiving a command of continuous recording, the system control circuit 10 first takes (reads) the allocation descriptors from the allocation memory 20. As illustrated in FIG. 4, the allocation descriptors include extent locations representing forefront positions of the ring regions A to E and extent lengths representing recording capacities of the ring regions A to E. 1st to 5th allocation descriptors (1st AD to 5th AD in the drawing) are appended to the ring regions A to E respectively. The allocation descriptors represent the access order. The access order is either the recording order or the reproducing order. In other words, the allocation memory 20 stores information about the recording or reproducing order with respect to the ring regions A to E.

The system control circuit 10 supplies a ring region recording command to the hard disc device 14 such that the television shows are recorded in the ring regions A to E in the order specified by the 1st to 5th allocation descriptors successively and circulatedly. Upon receiving the ring region recording command, the hard disc device 14 records the television shows (MPEG signals M1 or M2) in the ring regions A to E of the hard disc 120 in accordance with the allocation descriptors stored in the allocation memory 20.

At first, the hard disc device 14 controls a recording/reproducing head 121 to record the MPEG signals M1 (or M2) in the ring region A to which the first allocation descriptor (1st AD) is attached. As indicated by the leftmost unshaped arrow RC1 in FIG. 3, the recording/reproducing head 121 records the MPEG signals M1 (or M2) in the ring region A of the hard disc 120 from the front end T1 to the rear end. The recording proceeds towards the right in FIG. 3. When the recording/reproducing head 121 reaches the rear end of the ring region A (i.e., when the recording in the ring region A is complete), the hard disc device 14 issues a track jump command to the recording/reproducing head 121 such that the recording/reproducing head 121 jumps to the front end T3 of the ring region C, to which the second allocation descriptor (2nd AD) is attached. The head 121 track-jumps as indicated by the broken line arrow JP1 in response to the track jump command and restarts the recording from the front end T3 of the ring region C of the hard disc 120 as indicated by the unshaded arrow RC2. Therefore, the MPEG signals M1 (or M2) supplied from the tuner 11 are subsequently recorded in the ring region C of the hard disc 120. When the recording/reproducing head 121 reaches the rear end of the ring region C, the hard disc device 14 issues a track jump command to the head 121 such that the head 121 jumps to the front end T5 of the ring region E, to which the third allocation descriptor (3rd AD) is attached. The head 121 track-jumps as indicated by the broken line arrow JP2 in response to the track jump command and restarts the recording from the front end T5 of the ring region E of the hard disc 120 as indicated by the unshaded arrow RC3. Therefore, the MPEG signals M1 (or M2) supplied from the tuner 11 are recorded in the ring region E of the hard disc 120. When the recording/reproducing head 121 reaches the rear end of the ring region E, the hard disc device 14 issues a track jump command to the head 121 such that the head 121 jumps to the front end T4 of the ring region D, to which the fourth allocation descriptor (4th AD) is attached. The head 121 track-jumps as indicated by the broken line arrow JP3 in response to the track jump command and restarts the recording from the front end T4 of the ring region D of the hard disc 120 as indicated by the unshaded arrow RC4. Therefore, the MPEG signals M1 (or M2) supplied from the tuner 11 are recorded in the ring region D of the hard disc 120. When the head 121 reaches the rear end of the ring region D, the hard disc device 14 issues a track jump command to the head 121 such that the head 121 jumps to the front end T2 of the ring region B, to which the fifth allocation descriptor (5th AD) is attached. The head 121 track-jumps as indicated by the broken line arrow JP4 in response to the track jump command and restarts the recording from the front end T2 of the ring region B of the hard disc 120 as indicated by the unshaded arrow RC5. Therefore, the MPEG signals M1 (or M2) supplied from the tuner 11 are recorded in the ring region B of the hard disc 120. When the head 121 reaches the rear end of the ring region B, the hard disc device 14 issues a track jump command to the head 121 such that the head 121 jumps to the front end T1 of the ring region A, to which the first allocation descriptor is attached. The head 121 track-jumps as indicated by the broken line arrow JP5 in response to the track jump command and restarts the recording from the front end T1 of the ring region A of the hard disc 120 as indicated by the unshaded arrow RC1. In other words, the head 121 performs the recording process RC1 again. As a result, the MPEG signals M1 (or M2) supplied from the tuner 11 are overwritten in the ring region A of the hard disc 120.

After that, a series of processes described above are repeatedly performed in the following order:

Jumping Process JP1;

Recording Process RC2;

Jumping Process JP2;

Recording Process RC3;

Jumping Process JP3;

Recording Process RC4;

Jumping Process JP4;

Recording Process RC5;

Jumping Process JP5; and

Recording Process RC1.

Consequently, the divided ring regions A to E on the hard disc 120 are circulatedly utilized as the recording regions in the following order:

Ring Region A;

Ring Region C;

Ring Region E;

Ring Region D; and

Ring Region B.

The MPEG signals M1 (or M2) carrying the television program(s) received at the tuner 11 are therefore sequentially recorded in the ring regions A, C, E, D and B.

While the jumping processes JP1 to JP5 are occurring, the recording/reproducing head 121 cannot record any information on the hard disc 120. During each of the jumping processes JP1 to JP5, therefore, the system control circuit 10 stops the reading operation (signal supplying operation) to be performed by the recording track buffer 12. Accordingly, the recording track buffer 12 temporarily holds (accumulates) the MPEG signals M1 (or M2) supplied from the tuner 11 during each of the jumping processes. Every time the track jumping process is complete, the recording track buffer 12 supplies the MPEG signals to the hard disc 14. Consequently, the hard disc device 14 does not miss the MPEG signals supplied from the tuner 11, and is able to record the MPEG signals completely.

The longest jumping for a single jumping process in the above described continuous recording operations is the jumping process JP4 as understood from FIG. 3. The jumping distance of the jumping process JP4 is equal to a sum of lengths of three consecutive ring regions. As compared with the track jumping manner shown in FIG. 1 in which the recording/reproducing head jumps from the rear end of the entire ring buffer region to the front end, the largest jumping distance (JP4) in the illustrated embodiment is reduced. Since the largest jumping distance becomes smaller, it is possible to design the recording track buffer 12 to have a smaller recording capacity. The recording track buffer 12 is provided for dealing with discontinuity caused by the spaced ring regions or track jumping.

(3) Playback

When the user wants to play a television program recorded in the ring buffer region of the hard disc 120, the user pushes certain buttons on the operation unit 50 to specify a desired television program and enter a play command. As the operation unit 50 is operated in such manner, the system control circuit 10 issues a selection signal to the selector 13 such that the signals supplied from the reproducing track buffer 16 are selected and introduced to the MPEG decoder 17. The system control circuit 10 also supplies the play command to the hard disc device 14 together with information about the ring region(s) in which the desired television program has been recorded. This information includes a program start position in the ring region (or in the first one of the ring regions). If the desired program is recorded from the ring region C through A (i.e., recorded in the regions C, E, D, B and A in turn), for example, the hard disc device 14 retrieves the signals from the hard disc 120 in the following order and manner.

First, the hard disc device 14 moves the recording/reproducing head 121 over the ring region C to start the signal (information) retrieval from the program start position in the ring region C. Thus, the recording/reproducing head 121 starts reading the recorded signals from the ring region C as indicated by the unshaded arrow RC2. When the recording/reproducing head 121 reaches the rear end of the ring region C (i.e., when the reading in the ring region C is complete), the hard disc device 14 issues a track jump command to the head 121 such that the head 121 jumps to the front end T5 of the ring region E, to which the next allocation descriptor (3rd AD) is appended (FIG. 4). The head 121 track-jumps as indicated by the broken line arrow JP2 (FIG. 3) in response to the track jump command and restarts the reading from the front end T5 of the ring region E of the hard disc 120 as indicated by the unshaded arrow RC3. When the head 121 reaches the rear end of the ring region E, the hard disc device 14 issues a track jump command to the head 121 such that the head 121 jumps to the front end T4 of the ring region D, to which the next allocation descriptor (4th AD) is appended. The head 121 track-jumps as indicated by the broken line arrow JP3 in response to the track jump command and restarts the reading from the front end T4 of the ring region D as indicated by the unshaded arrow RC4. When the head 121 reaches the rear end of the ring region D, the hard disc device 14 issues a track jump command to the head 121 such that the head 121 jumps to the front end T2 of the ring region B, to which the next allocation descriptor (5th AD) is appended. The head 121 track-jumps as indicated by the broken line arrow JP4 in response to the track jump command and restarts the reading from the front end T2 of the ring region B as indicated by the unshaded arrow RC5. When the head 121 reaches the rear end of the ring region B, the hard disc device 14 issues a track jump command to the head 121 such that the head 121 jumps to the front end T1 of the ring region A, to which the next allocation descriptor (1st AD) is appended. The head 121 track-jumps as indicated by the broken line arrow JP5 in response to the track jump command and restarts the reading from the front end T1 of the ring region A as indicated by the unshaded arrow RC1. When the head 121 reaches the end of the recorded television program in the ring region A, the head 121 stops the reading operation.

The MPEG signals read from the ring buffer region of the hard disc 120 by the above described series of reproducing operations RC2, RC3, RC4, RC5 and RC1 are introduced to the display unit 200 via the reproducing track buffer 16, selector 13 and MPEG decoder 17. As a result, the television program specified by the user is played (displayed) on the screen of the display unit 20.

During each of the jumping processes JP1 to JP5, the recording/reproducing head 121 cannot read any information or signals from the hard disc 120. In this embodiment, the reproducing track buffer 16 sequentially stores (accumulates) the MPEG signals RM, which are intermittently retrieved from the hard disc device 14, and reads (supplies) the MPEG signals in a delayed manner corresponding to the track jumping period(s). By doing so, it is possible to continuously (without interruption) supply the reproduced MPEG signals RM to the MPEG decoder 17 even if the jumping processes take place.

The jumping process JP4 has the largest jumping distance for the single jumping process as understood from FIG. 3. Thus, the largest jumping distance is a sum of the lengths of the three ring regions B. C and D. As compared with the track jumping shown in FIG. 1 in which the recording/reproducing head jumps from the rear end of the entire ring buffer region to the front end of the entire ring buffer region, the largest jumping distance (JP4) in the illustrated embodiment is small. Since the largest jumping distance becomes smaller, it is possible to design the reproducing track buffer 16 to have a smaller recording capacity. The reproducing track buffer 16 is provided for storing (accumulating) the signals during the reproducing process including the track jumping.

Figure 5:
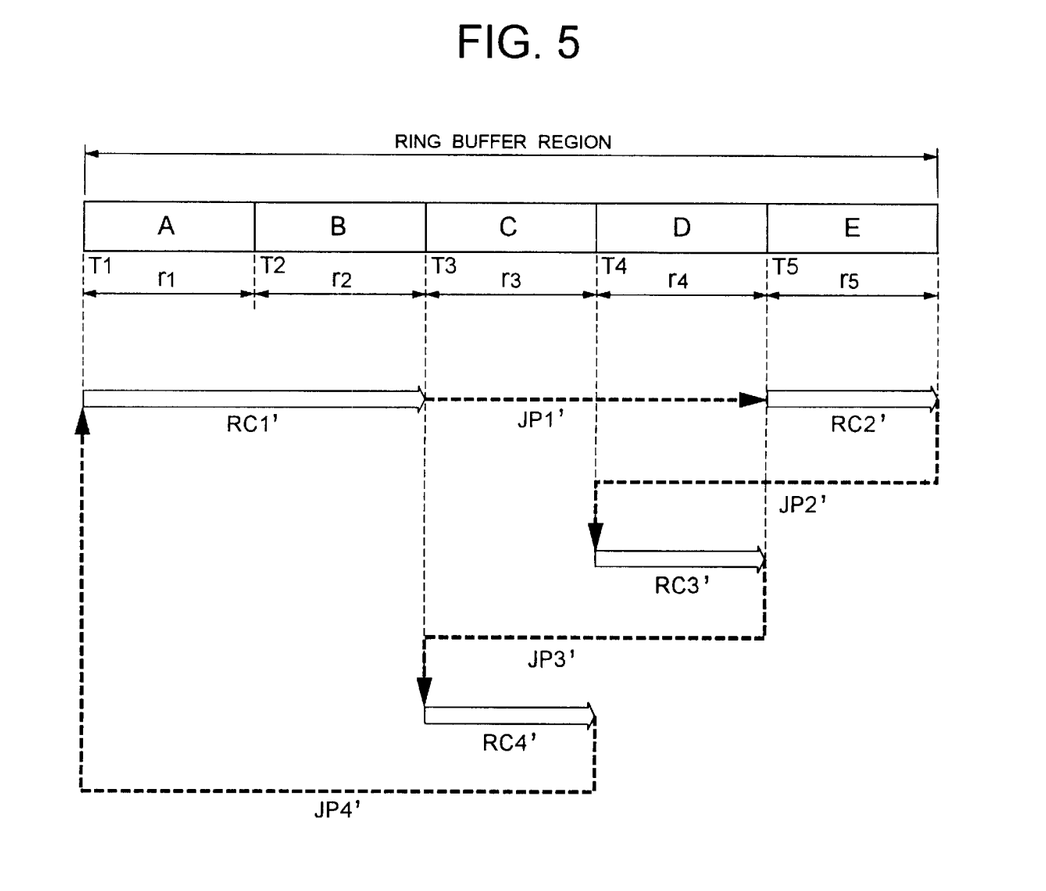
FIG. 5 illustrates alternative recording and reproducing procedures within the ring buffer region.

Although the single ring buffer region is divided into the five ring regions A to E in the above described embodiment (FIG. 3), the present invention is not limited in this regard. For example, the ring buffer region may be divided into more or less than five ring regions. Further, the track jumping manner and the recording and/or reproducing manner are not limited to those described in the embodiment. As illustrated in FIG. 5, for instance, the first recording (or reproducing) process may proceed over the two ring regions A and B as indicated by the unshaded arrow RC1', and the subsequent jumping occurs over the two ring regions C and D as indicated by the broken line arrow JP1'. The second recording may then start from the ring region E. In this alternative embodiment, it can be said that the ring buffer region is divided into four ring regions since the combination of the ring regions A and B can be considered as a single ring region.

In sum, it is satisfactory as long as the ring buffer region is divided into a plurality of ring regions, and the signals are recorded in (or reproduced from) the ring regions from one end of the ring buffer region to the other end of the ring buffer region and from the other end of the ring buffer region to the one end of the ring buffer region, by skipping over at least one ring region.

Although the recording capacities of the ring regions A to E are equal to each other, i.e., the extent lengths r1, r2, r3, r4 and r5 (FIG. 4) are equal to each other in the above described embodiment, it is acceptable for the ring regions to have different recording capacities.

It should be noted that an optical recording/reproducing apparatus and an optical recording medium, which may be removable from the recording/reproducing apparatus, may be employed instead of the hard disc apparatus 14 and the hard disc 120. The hard disc 120 is an example of a magnetic recording medium.

This application is based on a Japanese patent application No. 2001-53601, and the entire disclosure thereof is incorporated herein by reference.

What is claimed is:

1. An information recording and reproducing method for recording and reproducing a signal in and from a ring buffer region of a recording medium, the ring buffer region being divided into a plurality of ring regions, the information recording and reproducing method comprising:

A) at least one of recording and reproducing the signal in and from the plurality of ring regions of the ring buffer region from a first end of the ring buffer region towards a second end of the ring buffer region by skipping over at least one ring region at a time; and B) at least one of recording and reproducing the signal in and from those ring regions of the ring buffer region which are skipped over in (A) from the second end of the ring buffer region towards the first end of the ring buffer region.

2. The information recording and reproducing method according to claim 1, wherein (A) and (B) are performed repeatedly.

3. The information recording and reproducing method according to claim 1, wherein the at least one ring region comprises one ring region.

4. The information recording and reproducing method according to claim 1, wherein the plurality of ring regions comprise a first ring region, a second ring region, a third ring region, a fourth ring region, and a fifth ring region, and the signal is recorded at least one of in and reproduced from the first ring region, the third ring region, the fifth ring region, the fourth ring region and the second ring region in turn.

5. The information recording and reproducing method according to claim 1, further comprising:

providing the ring buffer region including the plurality of ring regions.

6. An information recording and reproducing apparatus for recording and reproducing a signal in and from a ring buffer region of a recording medium, the ring buffer region being divided into a plurality of ring regions, the information recording and reproducing apparatus comprising:

a recording and reproducing head for at least one of recording and reproducing the signal at least one of in and from the plurality of ring regions;

a memory for storing a predetermined order, wherein the predetermined order includes skipping over at least one ring region at a time; and a movement mechanism for moving the recording, wherein the movement mechanism moves the recording and reproducing head from a first end of the ring buffer region towards a second end of the ring buffer region, and from the second end of the ring buffer region towards the first end of the ring buffer region.

7. An apparatus for recording and reproducing a signal in and from a ring buffer region of a recording medium, the ring buffer region being divided into a plurality of ring regions, comprising:

means for at least one of recording and reproducing the signal in and from the plurality of ring regions of the ring buffer region from a first end of the ring buffer region towards a second end of the ring buffer region by skipping over at least one ring region at a time; and means for at least one of recording and reproducing the signal in and from those ring regions of the ring buffer region which are skipped over from the second end of the ring buffer region towards the first end of the ring buffer region.

8. The apparatus according to claim 7, wherein the plurality of ring regions comprises a first ring region, a second ring region, a third ring region, a fourth ring region, and a fifth ring region, and the signal is recorded at least one of in and reproduced from the first ring region the third ring region, the ring region, the fourth ring region and the second ring region in turn.

9. The apparatus according to claim 8, wherein sizes of the first to fifth ring regions comprise non-identical sizes.

10. The information recording and reproducing method according to claim 1, wherein the plurality of ring regions comprise a first ring region, a second ring region, a third ring region, a fourth ring region, and a fifth ring region, and the signal is recorded at least one of in and reproduced from the first and the second ring regions, the fifth ring region, the fourth ring region, and the third ring region in turn.

11. The apparatus according to claim 7, wherein a size of at least one of the plurality of ring regions is different than a size of another of the plurality of ring regions.

12. An information recording and reproducing apparatus for recording and reproducing a signal in and from a ring buffer region of a recording medium, the ring buffer region being divided into a plurality of ring regions, the information recording and reproducing apparatus comprising:

a recording and reproducing head for at least one of recording and reproducing the signal at least one of in and from the plurality of ring regions;

a memory for storing a predetermined order, wherein the predetermined order includes skipping over at least one ring region at a time; and a movement mechanism for moving the recording and reproducing head in accordance with the predetermined order, wherein the predetermined order includes skipping over at least one ring region at a time from a first end of the ring buffer region towards a second end of the ring buffer region, and from the second end of the ring buffer region towards the first end of the ring buffer region.

13. An information recording and reproducing apparatus for recording and reproducing a signal in and from a ring buffer region of a recording medium, the ring buffer region being divided into a plurality of ring regions, the information recording and reproducing apparatus comprising:

a recording and reproducing head for at least one of recording and reproducing the signal at least one of in and from the plurality of ring regions;

a memory for storing a predetermined order, wherein the predetermined order includes skipping over at least one ring region at a time; and a movement mechanism for moving the recording and reproducing head in accordance with the predetermined order, wherein a length of movement in accordance with the predetermined order, of the movement mechanism from a second end of the ring buffer region towards the first end of the ring buffer region is less than a length of the ring buffer region.

14. An information recording and reproducing apparatus for recording and reproducing a signal in and from a ring buffer region of a recording medium, the ring buffer region being divided into a plurality of ring regions, the information recording and reproducing apparatus comprising:

a recording and reproducing head for at least one of recording and reproducing the signal at least one of in and from the plurality of ring regions;

a memory for storing a predetermined order, wherein the predetermined order includes skipping over at least one ring region at a time; and a movement mechanism for moving the recording and reproducing head in accordance with the predetermined order, wherein a maximum length of movement in accordance with the predetermined order, of the movement mechanism from a second end of the ring buffer region towards the first end of the ring buffer region is less than a length of the ring buffer region.

15. An information recording and reproducing method comprising:

at least one of recording a signal in a ring buffer region of a recording medium, wherein the ring buffer region comprises a plurality of ring regions, and reproducing the signal from the plurality of ring regions of the ring buffer region from a first end of the ring buffer region towards a second end of the ring buffer region by skipping over at least one of the plurality of ring regions at a time; and at least one of recording the signal in those regions of the ring buffer region which are skipped and reproducing from those signals of the ring buffer region which are skipped from the second end of the ring buffer region towards the first end of the ring buffer region.

16. An information recording and reproducing method comprising:

recording a signal in a ring buffer region including a plurality of ring regions of a recording medium from a first end of the ring buffer region towards a second end of the ring buffer region by skipping over at least one of the plurality of ring regions at a time; and recording the signal in those regions of the ring buffer region which are skipped from the second end of the ring buffer region towards the first end of the ring buffer region.

17. An information recording and reproducing method comprising:

reproducing a signal from a plurality of ring regions of a ring buffer region from a first end of the ring buffer region towards a second end of the ring buffer region by skipping over at least one of the plurality of ring regions at a time; and reproducing from those signals of the ring buffer region which are skipped from the second end of the ring buffer region towards the first end of the ring buffer region.

* * * * *

UNITED STATES PATENT AND TRADEMARK OFFICE
CERTIFICATE OF CORRECTION

PATENT NO. : 6,804,178 B2
DATED : October 12, 2004
INVENTOR(S) : Tada et al.

It is certified that error appears in the above-identified patent and that said Letters Patent is hereby corrected as shown below:

Column 9,
Line 48, claim 6 should read as follows:
    An information recording and reproducing apparatus for recording and reproducing a signal in and from a ring buffer region of a recording medium, the ring buffer region being divided into a plurality of ring regions, the information recording and reproducing apparatus comprising:
    a recording and reproducing head for at least one of recording and reproducing the signal at least one of in and from the plurality of ring regions;
    a memory for storing a predetermined order, wherein the predetermined order includes skipping over at least one ring region at a time; and
    a movement mechanism for moving the recording and reproducing head in accordance with the predetermined order,
    wherein the movement mechanism moves the recording and reproducing head from a first end of the ring buffer region towards a second end of the ring buffer region, and from the second end of the ring buffer region towards the first end of the ring buffer region.

Signed and Sealed this

Twenty-fourth Day of May, 2005

JON W. DUDAS
*Director of the United States Patent and Trademark Office*